Dec. 17, 1968 A. MARAGHE 3,416,757
AIRCRAFT DOOR ACTUATOR
Filed April 4, 1967 2 Sheets-Sheet 1
Fig. 1
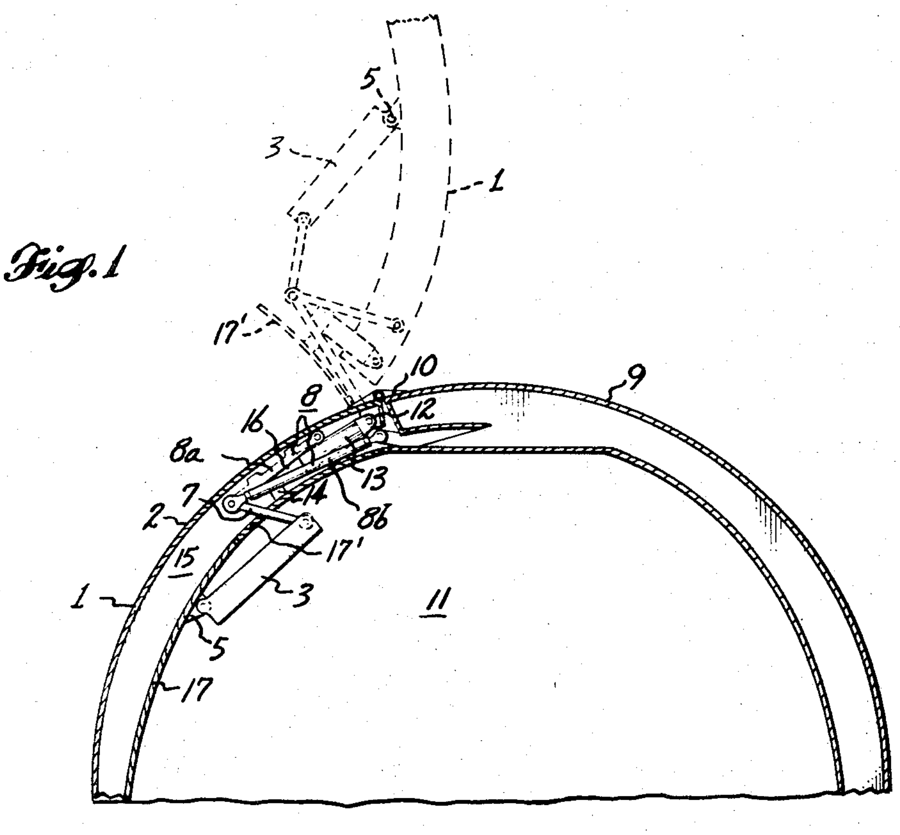
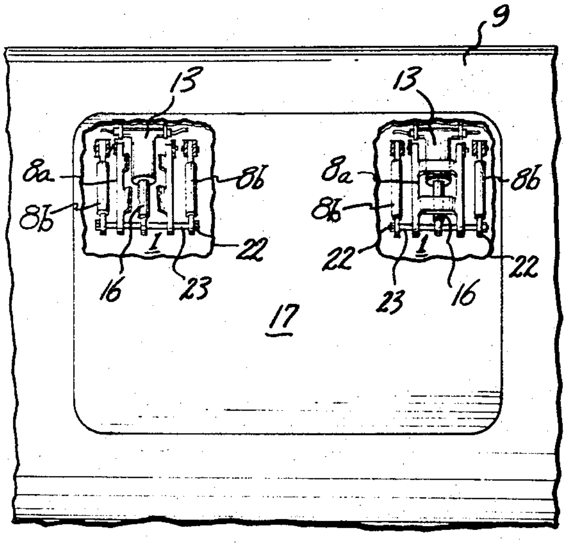
Fig. 2.
INVENTOR.
ALEX MARAGHE
BY K. W. Thomas Dec. 17, 1968 A. MARAGHE 3,416,757

AIRCRAFT DOOR ACTUATOR

Filed April 4, 1967 2 Sheets-Sheet 2

INVENTOR.
ALEX MARAGHE
BY K. W. Thomas

United States Patent Office 3,416,757
Patented Dec. 17, 1968

1

3,416,757
AIRCRAFT DOOR ACTUATOR

Alex Maraghe, Seattle, Wash., assignor to The Boeing Company, Seattle, Wash., a corporation of Delaware
Filed Apr. 4, 1967, Ser. No. 628,437
1 Claim. (Cl. 244—129)

ABSTRACT OF THE DISCLOSURE

An airplane cargo door hinged about a horizontal, longitudinal axis is opened and closed by a hydraulic cylinder and linkage contained entirely within the space between the exterior and interior door wall panels. Luggage racks pivotally mounted on the interior door panel are connected to the linkage and steered clear of the doorway when the door is opened.

*Background of the invention*

This invention relates to aircraft fuselage door actuator mechanisms and more particularly to an actuator mechanism for opening and closing an aircraft fuselage door about a generally horizontal, longitudinal axis wherein the actuator mechanism is wholly contained within the space between the interior and exterior wall panels of the fuselage door. Mechanisms heretofore used for actuating aircraft fuselage doors have often had a substantial part of their working and structural components so disposed that they extended either within the cabin space or protruded beyond the fuselage exterior skin. The latter placement is particularly undesirable since it subjects the mechanism to a severely hostile environment. During the different portions of a flight path, such a mechanism would be subjected to extremes of temperature and icing, as well as erosion from water, hail or ice crystals. Exposure to these environments would lead to early failure of the door operating mechanism. In addition, protuberance beyond the surface of the exterior skin of an airplane interferes with its aerodynamic characteristics.

Of course, environmental exposure of the door actuating mechanism can be avoided by locating the mechanism inside the fuselage in the cabin spaces. Such a location, however, poses certain disadvantages when the aircraft is used either as a cargo carrier or as a passenger carrier. With the concepts of palletized cargo handling now being perfected, it has become extremely important that the cabin spaces, especially in the door areas, be free of all unnecessary inwardly projecting protuberances in order to insure maximum volume loading of cargo. Other important considerations are rapidity of cargo handling and lessening of probability of damage to the cargo and the aircraft structure. In the case of a passenger carrying aircraft, inwardly extending door operating mechanisms pose a safety hazard to both the passengers and the air crew. Such mechanisms also suffer from lack of passenger acceptance because of their cumbersome appearance and, when grease-like lubricants are used, from their lack of cleanliness.

*Summary of the invention*

The general purpose of this invention is to provide an aircraft door actuating mechanism that is wholly contained within the space between the outside fuselage wall panel or skin and the inside cabin panel. Such placement protects the mechanism from adverse environmental exposure without intruding upon either the sensibilities and safety of the aircraft passenger or upon the cargo carrying volume of the aircraft. In an aircraft designed to be quickly changed from one carrying passengers to one carrying cargo, these advantages become doubly important. In addition, other structural elements mounted on

2 the cabin wall panel such as luggage racks or passenger service units can be advantageously connected to the door actuator mechanism by a suitable linkage in order to steer them so as to avoid interference with the door opening. It is desirable to provide dual actuators, each supplied with an independent energizing source so that upon failure of one actuator, the other will be still capable of opening and closing the door.

An object of the teachings of this invention is to provide means for hinge opening a large portion of the fuselage of an aircraft to: (a) canopy position, adequate for normal cargo loading; and (b) fully open or upright position for vertical cargo loading, i.e., the cargo is first elevated considerably above the aircraft floor level and then placed aboard by gradual lowering of the cargo pallet to make contact with the aircraft floor.

Another object of the teachings of this invention is to provide maximum utilization of available cargo space for palletized loading in an otherwise passenger accommodating aircraft. The hinge opening means includes an actuator mechanism which is completely concealed between the exterior and interior fuselage panels which form the aircraft body and door structure. There are no protrusions beyond the normal interior cabin panels. In this manner, unsightly mechanisms are removed from passenger view when the aircraft is converted from cargo to passenger sevice.

Another object of the teachings of this invention is to provide actuator means, for opening a large portion of the fuselage of an aircraft, capable of moving a door panel against a wind velocity of 40 knots and, once open, holding the door against a wind velocity of 75 knots.

*Brief description of the drawings*

A preferred embodiment of the invention is illustrated in the accompanying drawings, in which:

FIGURE 1 is a transverse sectional view through the aircraft structure or fuselage defining the cabin space and illustrating the door admitting thereto and one of two typical actuators.

FIGURE 2 is an elevational view of the door partially cut away as seen from the cabin space showing a plan view of the two actuators.

*Description of the preferred embodiment*

Figures 3, 4, 5, 6:
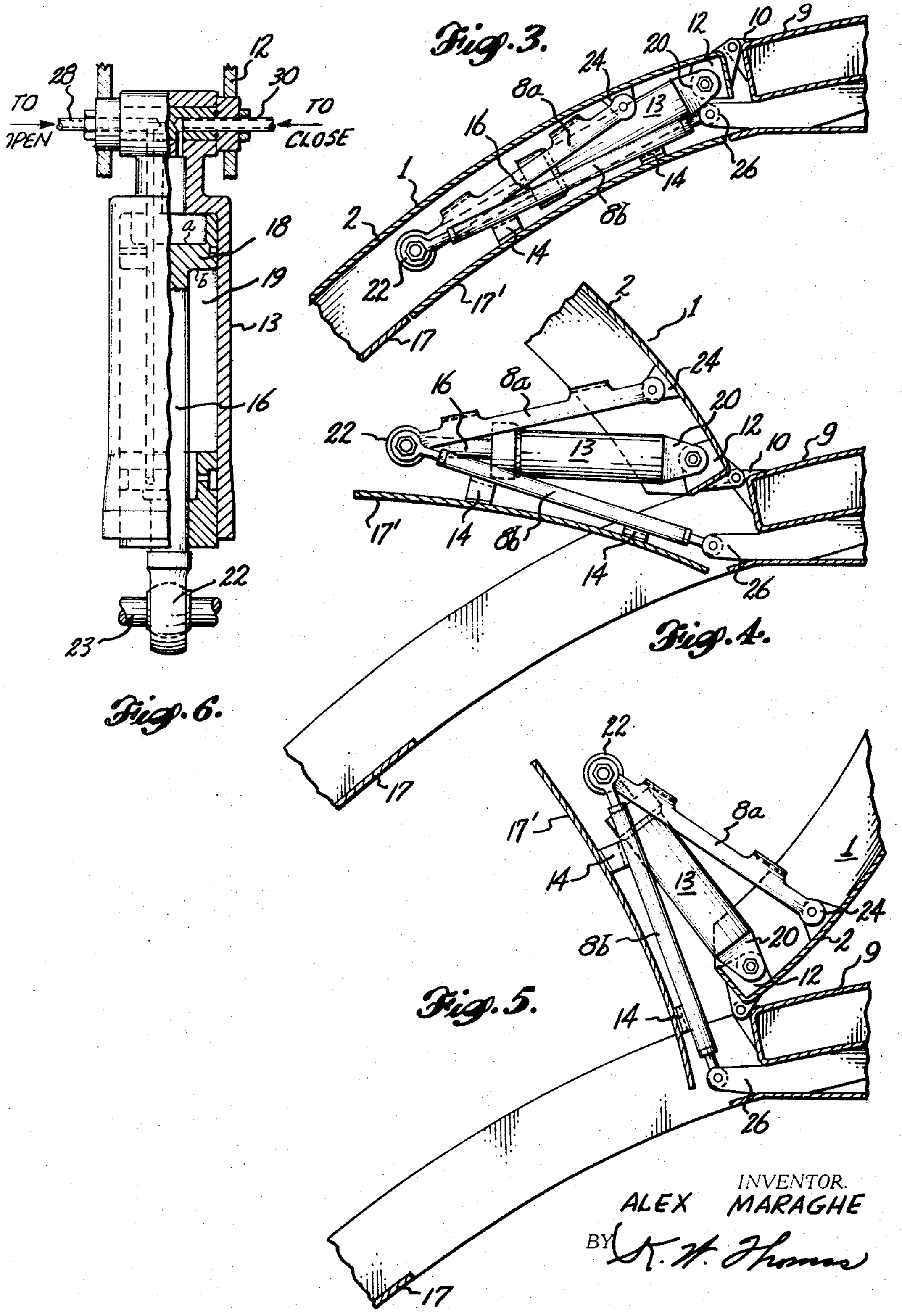
FIGURE 3 is a transverse sectional view detailing the hydraulic actuator mechanism with the door in a closed position.
FIGURE 4 is a transverse sectional view of the hydraulic actuator mechanism with the door in a partially open or canopy position.
FIGURE 5 is a transverse sectional view of the hydraulic actuator mechanism with the door in a fully open position.
FIGURE 6 is a cutaway section of a typical hydraulic actuator according to the teachings of this invention.

Referring to FIGURE 1, the aircraft fuselage structure, indicated generally at 9, defines an enclosed cabin space 11 to which fuselage door 1 admits from the exterior. Door 1, in the embodiment of FIGURE 1, is shown hingedly connected at 10, along its upper edge, to the upper edge of aircraft fuselage structure 9. Door 1 is mounted in such a way that it may swing outwardly to open and inwardly to close (clockwise and counterclockwise, respectively, as shown in FIGURE 1), its movement being effected by a pair of actuators 13, only one of which is seen in FIGURE 1, completely contained within space 15 defined by exterior wall panel 2 and interior wall panel 17 of door 1. Actuator cover panel 17′ fastened to member *8b* of first linkage means 8 by braces 14 serves to conceal actuator 13 when door 1 is in a closed position. Luggage rack 3 is attached to panel 17 by hinge 5 and is also attached to first linkage means 8 by a second linkage means 7. In this fashion, as door 1 is actuated to an open position, luggage rack 3 and actuator panel 17' are carried with door 1 by forces transmitted through linkage 7 and braces 14, respectively.

Actuator 13 is supported at end 20 (seen in FIGURES 3, 4 and 5) to door 1 by bracket 12. The manner in which actuator 13 transmits forces to first linkage means 8 so as to open or close door 1 will be described more fully with reference to FIGURES 3 through 5.

With reference to FIGURE 2, two actuators 13 are shown, by means of cutaway views, disposed between exterior wall panel 2 and interior wall panel 17 of door 1. Piston 16 of actuator 13 is connected by any convenient means to cross bar 23. Cross bar 23, in turn, is connected by nuts 22 with linkages **8*a* and 8*b* of first linkage means 8. Thus, forces generated by movement of piston 16 are transmitted by bar 23 to linkages 8*a* and 8*b***.

With reference to FIGURES 3 through 5, actuator 13 is shown with door 1 in a closed position, half open or canopy position, and fully open position, respectively. One linkage **8*a* of first linkage means 8 is pivotally attached by bracket 24 to door 1 and another linkage 8*b* of first linkage means 8 to aircraft structure 9 by bracket 26. In operation, door 1 will be traced from its closed position in FIGURE 3 to its fully open position in FIGURE 5. In the closed position, piston member 16 of actuator 13 is shown in its fully extended position. To open door 1, piston 16 is driven to translate, generally to the right in FIGURES 3–5 as shown, and move into the cylinder casing of actuator 13, more fully described below. As piston 16 so translates, its force is transmitted by cross bar 23 (as seen in FIGURE 2) to linkages 8*a* and 8*b*. The force in linkage 8*b* bears against bracket 26 and lifts door 1 causing it to pivot, clockwise on the drawings as shown in FIGURES 3–5, about hinge 10. As door 1 begins to pivot in this manner about hinge 10, actuator panel 17' moves with link 8*b* due to brackets 14. Door 1 continues in its arcuate path until actuation of piston 16 is stopped (e.g., with door 1 in canopy position as in FIGURE 4) or until piston 16 reaches the full extent of its travel into the cylinder casing of actuator 13 and door 1 and panel 17' have reached the fully open position as shown in FIGURE 5. To close door 1, actuator 13 operates in reverse, causing piston 16 to translate from the position shown in FIGURE 5 to its fully extended position without the cylinder casing of actuator 13** as shown in FIGURE 3.

The means by which piston 16 is caused to translate can be fully understood with reference to FIGURE 6. In FIGURE 6, piston 16 having piston head 18 is shown disposed to slide within cylinder 19 of actuator 13. Piston 16 is shown in FIGURE 6 at its position within cylinder 19 when door 1 is in the open position, i.e., the position shown in FIGURE 5. When it is desired to close door 1, means (not shown) cause fluid to flow through conduit 30 against face *a* of piston head 18 to drive piston 16 in a translating manner until it is fully extended without cylinder 19 as shown in FIGURE 3. Again, when it is desired to open door 1 to the position of FIGURE 5, means (not shown) cause fluid to flow through conduit 28 against face *b* of piston head 18 to drive piston 16 in a translating manner into cylinder 19 to the position shown in FIGURE 5 and FIGURE 6.

The application of this invention provides for easy opening of a cargo door 1 to a canopy (partially open) or fully open position as desired. When both actuators 13, seen in FIGURE 2, are in operation, opening or closing of door 1 can be performed in normal weather as well as windy weather with winds blowing up to 40 knots. Should one actuator 13 fail to function due to loss of pressure in cylinder 19, the other actuator 13 can open or close door 1 easily even though winds of 15 knots exert pressures against door 1. Such independence of operation is achieved by having each actuator 13 supplied by separate hydraulic fluid sources (not shown). The entire actuator system and accompanying linkages are wholly placed within the space 15 defined by exterior wall panel 2 and interior wall panel 17 of door 1 so as to save space and make the interior of a passenger craft as presentable as possible.

I claim:

1. In combination with an airplane fuselage having a peripheral wall defining a doorway therein and door structure for closing the doorway, said door structure including spaced interior and exterior wall panels; actuator means for selectively closing and opening the door structure, said actuator means comprising:
   (a) door linkage means connected between said door structure and the peripheral wall of the fuselage doorway;
   (b) power operable means disposed substantially entirely between said interior and exterior wall panels of said door structure and connected to the door linkage means for selectively actuating the door linkage means to open and close the door structure;
   (c) a luggage rack pivotally connected to said door structure; and
   (d) luggage rack linkage means connected between the luggage rack and the door linkage means for maintaining the luggage rack in a position clear of said doorway when said door structure is in an open position.

References Cited

UNITED STATES PATENTS

| | | | |
|---|---|---|---|
| 2,748,855 | 6/1956 | Siems et al. | 244—129 |
| 2,942,813 | 6/1960 | English | 244—129 |
| 3,183,873 | 5/1965 | Hamilton | 49—340 |
| 3,274,732 | 9/1966 | Murakami | 49—340 |

MILTON BUCHLER, *Primary Examiner.*

J. PITTENGER, *Assistant Examiner.*